United States Patent [19]

Wilder

[11] Patent Number: 5,234,319
[45] Date of Patent: Aug. 10, 1993

[54] SUMP PUMP DRIVE SYSTEM

[76] Inventor: Richard W. Wilder, 13400 Dunwoody Dr., Elm Grove, Wis. 53122

[21] Appl. No.: 878,221

[22] Filed: May 4, 1992

[51] Int. Cl.⁵ .................................................. F04D 15/00
[52] U.S. Cl. .......................................... 417/40; 417/45
[58] Field of Search ............................... 417/36, 40, 45

[56] References Cited

U.S. PATENT DOCUMENTS

| | | | |
|---|---|---|---|
| 3,021,789 | 2/1962 | Ryden | 417/45 |
| 3,568,121 | 3/1971 | Nash | 417/36 |
| 3,726,606 | 4/1973 | Peters | 417/7 |
| 3,814,544 | 6/1974 | Roberts et al. | 417/40 |
| 4,171,186 | 10/1979 | Chapman | 417/40 |
| 4,313,060 | 1/1982 | Fickenscher et al. | |
| 4,473,756 | 9/1984 | Brigden et al. | |
| 4,528,457 | 7/1985 | Keefe et al. | |
| 4,672,520 | 6/1987 | Ueda et al. | |
| 4,673,826 | 6/1987 | Masson | |
| 4,709,318 | 11/1987 | Gephart et al. | |
| 4,719,550 | 1/1988 | Powell et al. | |
| 4,728,808 | 3/1988 | Bet-Esh et al. | |
| 4,751,398 | 6/1988 | Ertz, III | |
| 4,876,460 | 10/1989 | Johnson | |
| 4,894,601 | 1/1990 | Watkins | 362/276 |
| 4,934,822 | 6/1990 | Higaki | 363/37 |
| 4,935,861 | 6/1990 | Johnson, Jr. et al. | |
| 5,088,297 | 2/1992 | Maruyama et al. | 417/45 |

OTHER PUBLICATIONS

Glentronics Product Brochure (The Basement Watchdog)—2 pages (date unknown).
Aquanot Product Brochure (Full Time Flood Protection)—2 pages (date unknown).
Aquanot Product Brochure (Safeguard Pump Comparison Sheet)ACE—1 pages (date unknown).
Aquanot Product Brochure (Safeguard Pump Comparison Sheet) Zoeller—1 page (date unknown).
Basement Flood Protector Product Brochure—2 pages (date unknown).
Wayne Scott Fetzer Product Brochure—1 page (date unknown).
Expert Product Brochure—1 page (date unknown).
F. E. Myers Water Ace Product Brochure—1 page (date unknown).
Simer Product Brochure—1 page (date unknown).

*Primary Examiner*—Richard A. Bertsch
*Assistant Examiner*—David W. Scheuermann
*Attorney, Agent, or Firm*—Jansson & Shupe, Ltd.

[57] ABSTRACT

The invention is an improvement in a sump pump drive system of the type operable in a normal or emergency mode, powered in the normal mode by a single phase AC source and having an AC-to-DC converter, a DC standby source, a sump pump and a pump drive motor. In the improved system, the drive motor is a poly-phase AC machine and the system further comprises a DC-to-AC inverter connected to the drive motor. The pump is driven using inverted DC power in both normal and emergency modes. For the first time, the system designer can select an "ideal" pump configuration (especially including speed), then an ideal motor configuration (especially including number of poles) and configure the system for a frequency to drive the pump and motor at that speed. Variants of the improved system include low rated motor terminal voltage (not more than the battery terminal voltage), a variable frequency capability for tailoring motor speed (and therefore, pumping rate) to sump water level and "soft" start and stop. Such variants also include a battery "exercise" feature and battery charging features extending battery life and returning the battery more quickly to a full-charge condition.

22 Claims, 5 Drawing Sheets

SUMP PUMP DRIVE SYSTEM

FIELD OF THE INVENTION

This invention is related generally to drive systems for electrically-powered devices and, more particularly, to such a system operating in a normal or emergency mode.

BACKGROUND OF THE INVENTION

The basements of many residential buildings are constructed with drainage systems to carry rain water away from the foundation. Such systems, required by many local building codes, keep the basement dry and prevent wall and floor damage due to running water and high localized humidity.

A basement is a building foundation which is excavated into the earth. Walls of brick, block or poured concrete support the above-ground structure of the building and the floor is usually formed of poured concrete.

Clay drain tiles, or perforated plastic pipes are installed around the perimeter walls to collect rain water which drains through the soil. These tiles are laid in a bed of gravel or sand, the porosity of which aids the drainage of water from the surrounding soil. The collecting tiles are laid with a slope which allows gravity to induce flow.

The water flows from the collecting tiles to the sump, which is a small pit in one corner of the basement. This pit is excavated below level of the collecting tiles, well below basement floor level.

Drainage systems have enabled the use of basements as additional storage, recreation and even living space. Wood paneled walls and carpeted floors are commonplace in basement recreation rooms. Most need to be protected from water damage by a reliable, properly operating system.

Such a system depends on an electric motor to drive a pump, usually a centrifugal pump, which lifts the water from a collecting sump. The pump is usually called on to operate only during heavy rainfalls and pump water away from the foundation through a hose to a drain field. In conventional systems, a water-level sensor is used to automatically turn the pump on when the sump fills to a predetermined high water level and stop the pump when the water level drops below a predetermined low water level.

Significantly, loss of utility-provided electric power renders the system inoperative unless special precautions are taken. If the power outage persists, water damage to the basement may be the result. The likelihood of such damage is aggravated by the typical coincidence of electric power outages with storms and heavy rainfall. To ensure protection of the basement and its contents from water damage, an uninterruptable power supply to the pumping system is required.

A brochure by Aquanot Co. describes a sump pump system using an AC-to-DC converter and a single 12 VDC motor to drive the sump pump from either the 60 Hz utility line or a 12 VDC battery. It can be used either as a standby system (to supplement a conventional AC system including motor) or it can be used as the primary system. According to the brochure, the control provides 14 amp. at 12 VDC (nominally 170 watts during battery or "emergency mode" operation) or 3.5 amp. at 120 VAC (nominally 420 watts during normal operation). Based solely on this data, it appears likely that the Aquanot system operates the pump at a greater pumping rate during normal operation than during battery operation.

A brochure describing the Glentronics Basement Watchdog system indicates that it is microprocessor controlled and uses a single pump motor for both normal and emergency operation. The brochure explains that the controller has a quick battery recharge feature and also shuts off the battery "trickle charge" when the battery reaches some predetermined voltage level. This suggests that two different charging rates are used in the Glentronics system.

The pump motor of the Glentronics system is understood to be rated 12 VDC and starts "across the line," i.e., without a soft start. Motor current is understood to be the same, irrespective of whether the motor is powered form the AC line or from the battery.

Product brochures by Basement Flood Protector, Wayne Scott Fetzer, F. E. Myers Water Ace, Simer and Expert describe sump pump systems used as standby systems only and incorporate motors and pumps separate from those of the conventional system. All use DC motors and standby batteries. Systems incorporating batteries typically use an automotive-type 12 VDC battery because of their low cost and wide availability.

U.S. Pat. No. 3,726,606 (Peters) shows a conventional two-pump, two-motor sump pump system. The apparatus shown in U.S. Pat. No. 4,672,520 (Ueda et al.), a current-source apparatus, includes a converter, a battery as a source of standby power, a current source inverter and a three phase electric motor. The battery in the Ueda et al. apparatus is connected on the AC line side of the converter rather than between the converter and the inverter. No charging circuit is described and when operating in a battery-powered mode, power to the motor is intermittent. Capacitors are coupled in parallel across the terminals of the three phase motor and while the apparatus is clearly microprocessor controlled, the control appears to extend only to gate control.

The uninterruptible power supply (UPS) apparatus shown in U.S. Pat. No. 4,709,318 (Gephart et al.) is a fixed-frequency, fixed-voltage, single-phase UPS system. It is intended for use with personal computers or similarly technically sophisticated instrumentation as a back-up power source. It includes an AC-to-DC converter, a DC-to-DC converter and what the patents calls a DC-to-AC converter arranged in that order from input to load.

While systems of the foregoing types have been generally satisfactory and widely used to drive sump pumps, they tend to be characterized by certain disadvantages. For example, their battery re-charging systems tend to boil the water out of the battery after several months on standby, leaving the battery inoperable when eventually called to emergency duty. And they do not recharge quickly, so multiple outages in succession can result in system failure.

A DC motor, with its brushes and commutator, is not well suited to sump pump applications. A commutator has a limited life due to friction and wear and life may be further shortened by high humidity and resulting corrosion. Further, DC motors incorporate cost unnecessary in an AC machine in that construction, machining and polishing of the commutator is relatively expensive. And DC motors use relatively-expensive "exotic" permanent magnet materials.

Another disadvantage is that pump drive motors are started "across the line" and accelerate to operating speed in a small fraction of a second. Across-the-line starting is more abusive to the structure of the pump and motor alike (the latter resulting from elevated starting current) than is "soft" (controlled acceleration) starting and the resulting clearly-audible "water hammer" noise can be distracting.

Yet another disadvantage is that such systems are incapable of modulating motor speed generally consistent with the rate of water flow into the sump. That is, they start and stop frequently, thereby unnecessarily abusing the motor and pump and creating unwanted noise.

Still another disadvantage relates to the fact that the life of an automotive-type lead acid battery is shortened when the battery goes unused for long periods. But known systems do not address this problem by providing, for example, a battery "exercise" feature to periodically draw energy from the battery and later re-charge it.

OBJECTS OF THE INVENTION

It is an object of this invention to provide an improved sump pump drive system overcoming some of the problems and shortcomings of those of the prior art.

Another object of this invention is to provide an improved sump pump drive system which uses but a single AC motor and driven pump for both normal and emergency operating modes.

Yet another object of this invention is to provide an improved sump pump drive system which uses a polyphase AC motor with its inherent ruggedness, reliability and long life at relatively modest cost.

Still another object of this invention is to provide an improved sump pump drive system which integrates battery charging functions, a battery "exercise" capability and self-diagnostic functions and provides dependable availability and improved battery life.

Another object of this invention is to provide an improved sump pump drive system which reduces stress and abuse on the motor and pump.

Yet another object of this invention is to provide an improved sump pump drive system which reduces or eliminates water hammer noise.

Still another object of this invention is to provide an improved sump pump drive system which can provide a uniform water pumping rate in both normal and emergency modes.

Another object of this invention is to provide an improved sump pump drive system which avoids the disadvantages of commutating DC pump drive motors.

Another object of this invention is to provide an improved sump pump drive system providing controlled acceleration of the drive motor.

How these and other objects are accomplished will become apparent from the following detailed description taken in conjunction with the drawing.

SUMMARY OF THE INVENTION

The invention is an improvement in a sump pump drive system of the type operable in a normal or emergency mode and powered in the normal mode by a single phase AC source such as the 60 Hz, 120 VAC utility line. The system has an AC-to-DC converter, a DC standby source such as a battery having a nominal terminal voltage of 12 VDC, for example. A sump pump and a pump drive motor are also included.

In the improved system, the drive motor is a polyphase AC machine and the system has a DC-to-AC inverter, preferably of the pulse width modulated, voltage source type, connected to the drive motor. The inverter uses DC power, either from the battery during emergency mode operation or from the AC utility line (through the rectifying converter) during normal operation when AC line power is available. In that way, the pump is driven using inverted DC power in both normal and emergency modes. And cost and space advantages accrue when the pump and its drive motor are constructed as an integrated "unitized" assembly.

It should be appreciated that "packaging" components which have heretofore been separate can offer substantial space savings and, when made in production quantities, cost savings. A water level sensor and the inverter may also be packaged or integrated into the pump-motor assembly.

The basic system configuration described above makes possible any one, some or all of several variants. For example, the rated voltage of the AC pump drive motor can be dramatically reduced below the nominal rated AC source voltage (in the United States) of 120 VAC, 240 VAC or 480 VAC. The motor can thereby operate at the same rated voltage, irrespective of whether the system is powered from the AC line or from the battery.

Preferably, the pump drive motor has a peak-to-peak rated voltage not in excess of the battery terminal voltage, e.g., 12 VDC. In fact, such motor may have a rated voltage well below such terminal voltage—6.0 VAC being but one of a large number of possible voltages. And it is to be appreciated that the system may use transformers and/or cascaded batteries and operate on voltages other than those expressly described herein. Such variations are considered to be within the scope of the invention.

It is known that for a given number of motor poles (fixed at the time of motor manufacture), motor speed varies with the frequency of the applied voltage. In one preferred system arrangement, the inverter provides voltage to the motor at either one of at least two frequencies. Such plural-frequency capability can be used in the new system to select frequency (and therefore motor speed) as a function of sump water level.

A water level sensor provides a signal representing water level. In a simpler configuration, the signal represents at least a lower level and a higher level of water in the sump. If the inverter frequency is variable in steps and when the frequency of its output voltage is increased at the higher water level, the motor rotates at a higher speed when the level of water in the sump reaches the higher level.

In a more refined system, the sensor provides a continuum of signals representing changing water level and the inverter provides output voltage to the motor at a frequency which is a function of water level in the sump and is continuously variable over a range. When the system is so arranged, the motor rotates at progressively higher speed with increasing sump water levels. In control parlance, the matter of water level control using the sump pump system may be said to represent a process.

The system has a process variable (the water level signal), a control variable (the inverter output frequency) and a reference value such as the desired minimum water level in the sump. Thus, the system is ideal for closed loop, "feedback" type control using what is known as a proportional-integral algorithm. But that is not all—the system has other beneficial features.

For example, where the inverter is of the variable voltage, variable frequency type and has a rated output voltage, the motor can be "soft started," i.e., started at a voltage substantially less than such rated output voltage. This brings the pump up to speed more slowly, thereby reducing annoying water-hammer noise characteristic of systems where the motor is started "across the line."

Inverter output voltage and frequency can vary in steps and the motor accelerated to running speed by "step-wise" increasing such voltage and frequency. Or the inverter output voltage and frequency can be continuously variable over a range and the motor accelerated to running speed by increasing output voltage and frequency in a continuum.

Conventional sump pump drive systems use 12 VDC lead acid automotive batteries as the DC standby source. Such batteries are not especially well configured to provide "deep-cycle" operation as is preferred in such a system. However, they are widely available and reasonably priced and have come to be the virtual universal choice in sump system. But known sump systems tend to abuse such batteries, typically by applying a too-high long term charging voltage. At the least, this tends to "boil away" the battery electrolyte.

The improved system has battery-saving features. For example, during extended normal system operation (a period during which AC line power is not interrupted), battery charging current is regulated to maintain a very low trickle charge, i.e., about 100 ma. Battery charging voltage is limited to a value not in excess of about 106-108% (about 13 volts) of the battery nominal full-charge terminal voltage of about 12 volts. Battery life is thereby extended and the rate of electrolyte diminution is reduced.

Another problem with conventional systems is that they do not recover quickly enough from a period of emergency-mode operation. To put it another way, they may perform poorly (or not at all) where there are two AC line failures spaced fairly closed together in time and where the first has significantly depleted the battery.

In emergency mode operation, the battery provides current at a nominal emergency value. In the improved system and following extended operation in the emergency mode (when the battery is drawn well down), the charging circuit provides a battery charge current at least about 30% greater than the nominal emergency value and preferably about 50% greater. The battery "quick charge" voltage is in the range of about 15-15.5 volts. This quick-charge feature brings the battery back up to rated voltage and current much more quickly to better prepare the system to handle such "back-to-back" line failures.

Another known feature of automotive batteries is that, like people, they tend to self-deteriorate when unused for extended times. Of course, such non-use is typical of a sump pump drive system capable of pumping in an emergency—but rarely called upon to do so.

Therefore, the improved system also includes a battery "exercise" circuit whereby during extended system operation in the normal mode (the usual case), energy is periodically drawn from the battery thereby substantially maintaining battery efficiency. One way to draw out such energy is by modulating the inverter to dissipate energy in the motor while yet avoiding motor rotation. Another way is to periodically dissipate energy in a resistive load.

The new system also has exceptional possibilities for pumps and their drive motors operated at "unconventional" speeds. For the first time in a sump pump drive system, the pump drive speed is the "independent variable" freed from the constraints of available motor speeds. That is, the pump designer can select the optimum pump drive speed between, say, 50 and 5000 rpm, which results in best pump performance, cost, size and the like.

Once the pump drive speed is so selected, the designer can select the "ideal" number of motor poles based solely upon manufacturing criteria. After such number of poles is selected, the inverter is configured to provide that output frequency which results in a motor speed nominally equal to the optimum pump drive speed.

To cite some examples, it is assumed the AC source has a substantially constant frequency (e.g., 50 or 60 Hz) and the motor has a rated nominal frequency at its maximum rated voltage. The designer may now use a "nonstandard" nominal frequency which is no less than about 105% or no greater than about 95% of the AC source frequency. Where the AC source frequency is 60 Hz, the motor nominal frequency is less than about 57 Hz or more than about 63 Hz.

This advance in the art represents an enormous expansion of the design freedom afforded designers of sump pumps and sump pump drive systems. No longer must a pump or system designer be limited to drive motors of, say, 900, 1200, 1800 or 3600 rpm operating speed and thereby be required to configure the pump to "fit" that speed. Indeed, the significance of this advance is difficult to appreciate fully.

DETAILED DESCRIPTIONS OF THE PREFERRED EMBODIMENTS

Figure 4:
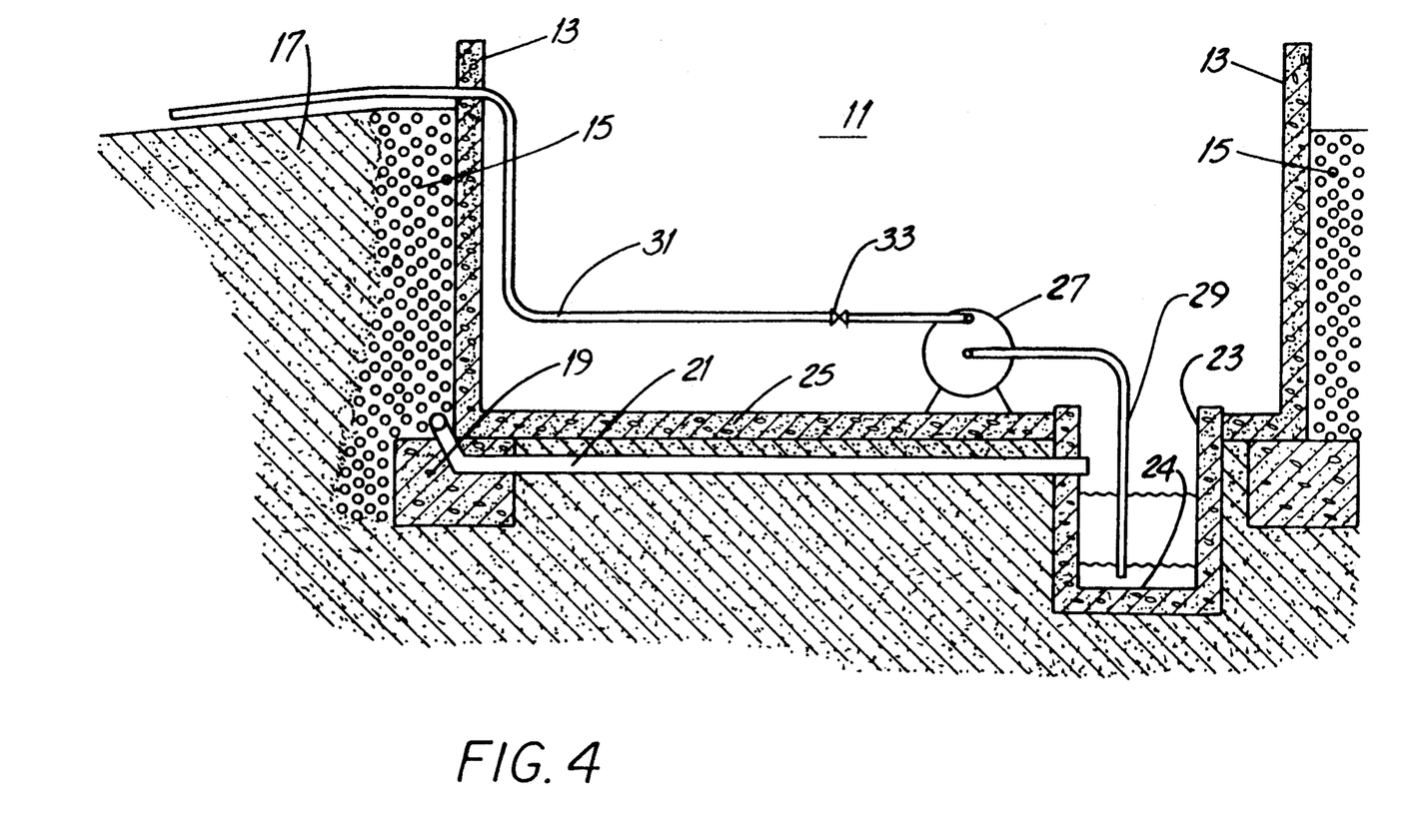
FIG. 4 is a cross-sectional side elevation view showing a basement/building foundation arrangement typical of the type in which the inventive system is used.

Before describing the invention, is provided immediately following the word "explanation" in line 33 an explanation of the operating environment in which the inventive system 10 is used. Referring first to FIG. 4, a below-ground basement 11 has walls 13 backfilled with gravel 15 and otherwise surrounded and supported by earth 17. The foundation 19 is equipped with tile-like water collecting pipes 21 extending around the foundation 19 at its perimeter and eventually draining to a sump 23 installed in a hole in the basement floor 25. Especially during heavy rain, water infiltrates through the gravel 15 and the pipes 21 and collects in the sump 23. From there, it must be removed and delivered to the building exterior in a way to substantially prevent water re-entry.

Accordingly, a motor-driven sump pump 27 includes an inlet 29, a discharge pipe 31 and an optional check valve 33 preventing the contents of the pipe 31 from siphoning back into the sump 23 after the pump 27 stops. In practice, the pump 27 is typically a volute centrifugal pump of the submersible type placed at or near the bottom 24 of the sump 23. A pump 27 of all-plastic construction is preferred for corrosion avoidance since such pump 27 can sit for very long periods of time in either wet or dry condition.

Figure 1:
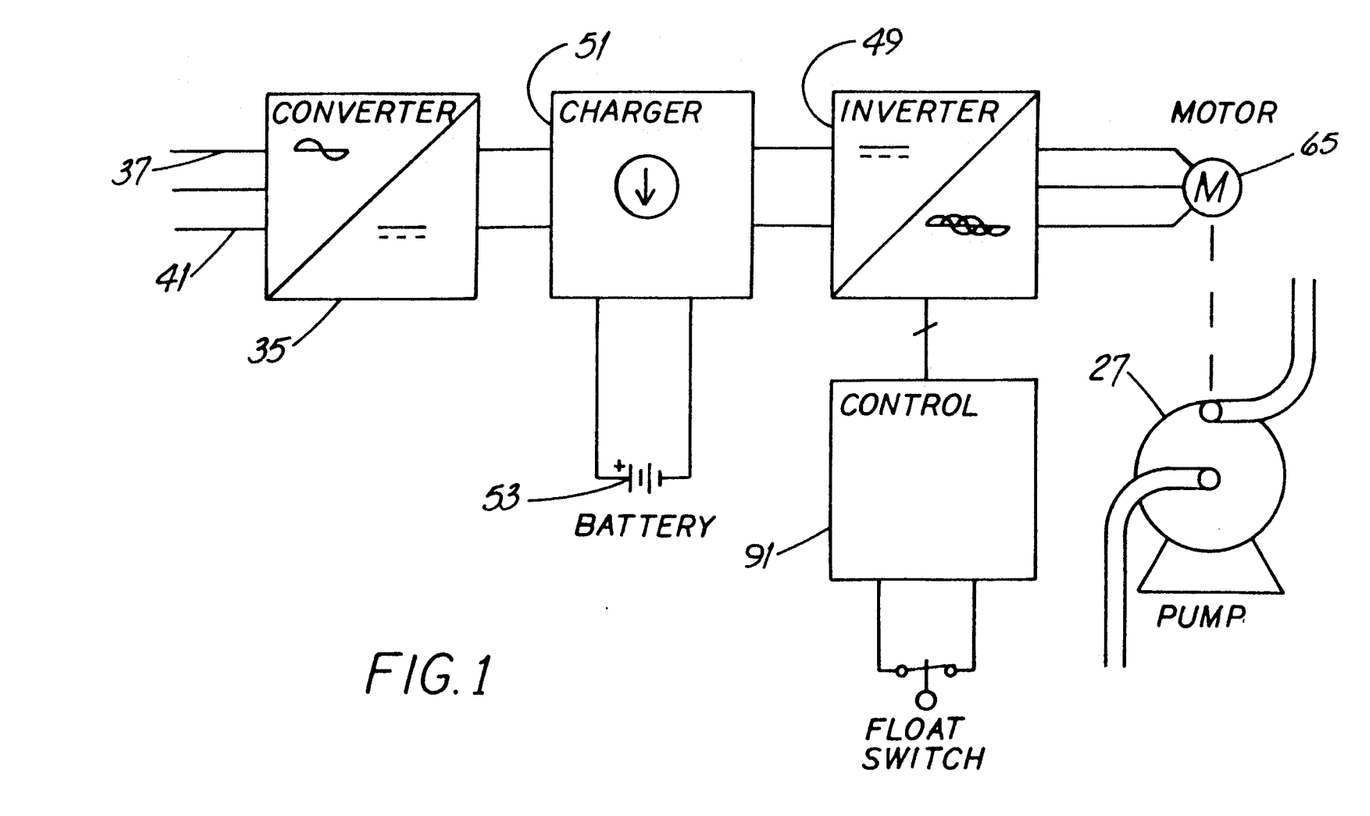
FIG. 1 is a block schematic diagram of an embodiment of the improved system of the invention shown in connection with a water-level float switch.
Figure 2:
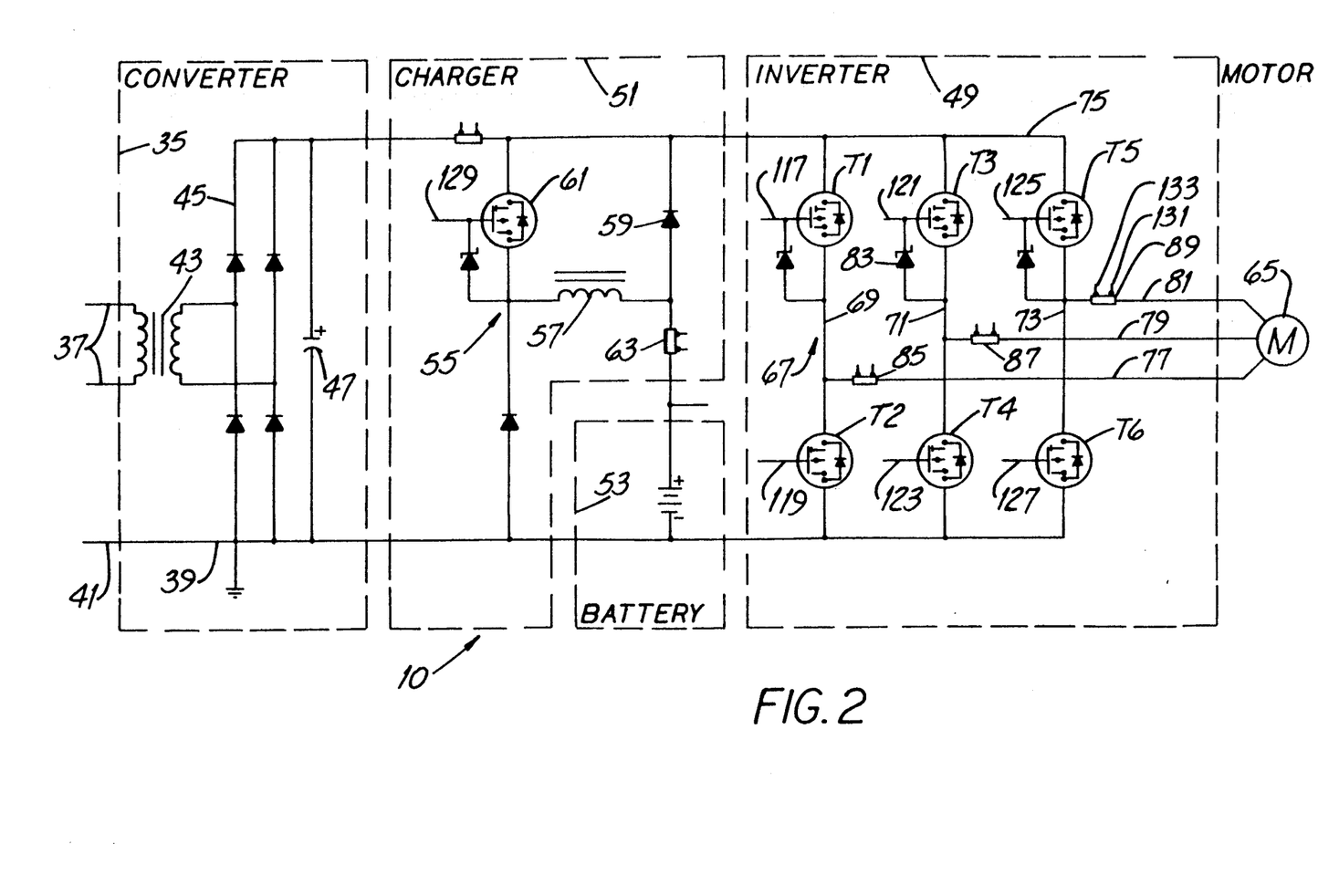
FIG. 2 is a simplified circuit diagram of the system of FIG. 1 with the control module omitted.

Referring next to FIGS. 1 and 2, the improved system 10 is shown to include a converter 35 having a pair of input terminals 37 for connection to an AC source such as the 120 VAC utility line. The converter 35 also includes a negative DC bus 39 and a negative bus terminal 41 used to ground the system to the third wire of the AC line as required by the National Electric Code. The converter 35 also includes a transformer 43, a full wave rectifier bridge 45 and a filtering capacitor 47. The converter 35 receives AC power from the line and converts it to DC power to supply energy to the inverter 49 during operation in the normal mode when the AC source is available. Such rectified DC power is also used by the charger 51 to charge the battery 53.

The charging circuit 55 regulates the magnitude of charging current flowing from the converter 35 to the battery 53 when the AC source is available. Such circuit 55 also routes battery current to the inverter 49 in the event of a failure of the AC source. In a highly preferred embodiment, the charging circuit 55 is current regulated and voltage limited and operates in either of two ways.

When the battery 53 is fully charged (as is normally the case), the charging circuit 55 provides a very small "trickle" of current to prevent the battery 53 from self-discharging. However, the voltage applied to the battery terminals during trickle charging is preferably limited as described above to avoid "boiling" the electrolyte out of the battery 53. Preferably, current is regulated by pulse width modulation and the inductor 57 filters out the ripple currents so that the battery charging current is substantially pure DC. A flyback diode 59 conducts charging current when the transistor 61 is not conducting and a shunt resistor 63 is provided for measuring battery current and voltage.

In the event of an extended power outage, i.e., the AC source is not available, the battery 53 may become deeply discharged if the pump 27 is required to be operated during that period. In anticipation of the possibility of two power outages closely spaced in time, the charging circuit 55 provides a battery charge current at least about 30% greater, and preferably about 50% greater, than the nominal value of current flowing from the battery 53 during emergency mode operation. This feature more rapidly recharges the battery 53 so that the system 10 is more likely to be available should a power outage quickly recur.

A DC-to-AC power inverter 49 converts DC energy from the battery to AC energy for the motor 65. The inverter characteristics govern motor speed and torque by controlling the magnitude of the voltage applied to the motor 65, the current flowing thereto and the frequency of the applied voltage. In a highly preferred embodiment, the inverter 49 is a pulse width modulated, variable frequency, DC-to-AC three phase inverter 49 operating at the nominal "full charge" battery terminal voltage.

A bridge circuit 67 includes six power transistors T1-T6 to synthesize polyphase AC power. Two transistors e.g., transistors T1, T2, are used in each leg 69, 71, 73 of the three phase inverter bridge circuit 61 and each leg synthesizes a single-phase sine wave. Such waves are spaced 120° apart in a known relationship for three-phase AC circuits.

The pair of transistors (like pair T1, T2) in each leg such as leg 69 are operated in complementary fashion. For example, the transistors T1 and T2 of the leg 69 are alternately switched to connect the positive DC bus 75 and then the negative DC bus 39 to phase line 77. Given the relatively low voltage and high currents if a 12 VDC automotive type battery is used as an emergency power source, MOSFET transistors are preferred at least for their relatively modest voltage drop characteristics. Zener diodes 83 protect the gates of the transistors T1-T6 from excessive gate voltage and shunt resistors 85, 87, 89 are used to measure currents and voltages relating to each motor phase.

Although a two-phase system may have fewer parts, it motor 65 are preferred. Such inverter 49 and motor 65 are relatively simple, inherently electrically balanced and less complex than systems with four or more phases.

An advantage of the new system 10 is that the pump 27 can be configured to take advantage of the variable speed drive system 10 and its inverter 49 and control circuit 91. In other words, the constraint of a standard motor, e.g., a four pole machine running at 1750 rpm at 60 Hz, is removed. A pump 27 configured to have a rated speed anywhere between, say, 5 and 5000 rpm is entirely practical with almost no effect on motor/inverter system cost.

Figure 3:
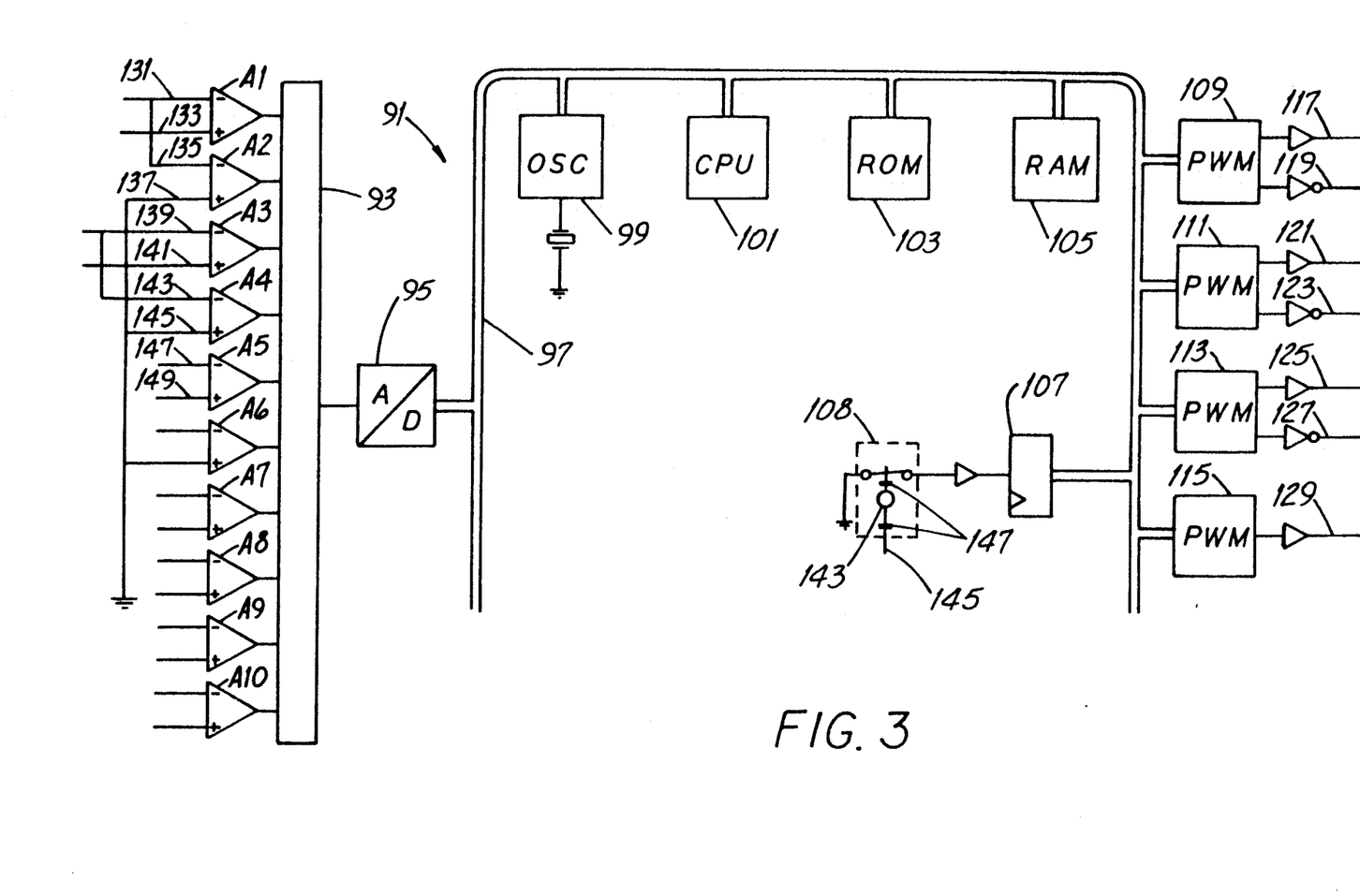
FIG. 3 is a block diagram of the control module.

Referring additionally to FIG. 3, the charger 51 and inverter 49 are controlled by a control circuit 91. Such circuit 91 preferably includes a plurality of input amplifiers A1-A10 connected to an analog multiplexer 93. The multiplexer 93 is connected to an analog-to-digital converter 95 connected in turn to a digital bus 97. An oscillator 99, central processing unit 101, read-only memory 103, random access memory 105 and water level sensor input circuit 107 are also connected to the bus 97, as are pulse width modulation output circuits. The output terminals 117 and 119 are connected to like-numbered terminals of transistors T1 and T2, respectively. In the same fashion, terminals 121, 123, 125, 127 are connected to like-numbered terminals on the inverter 49. The terminal 129 is connected to the transistor 61 to regulate battery charging current.

Terminals 131 and 133 are connected across like-numbered terminals of the shunt resistor 89 in the phase line 81 and terminals 135 and 137 are connected to the DC reference bus 39 and the terminal 133, respectively. In like manner, sequential pairs of amplifiers (such as pair A3, A4) are connected to resistors such as resistor 87 and to the reference bus 39.

Figure 5:
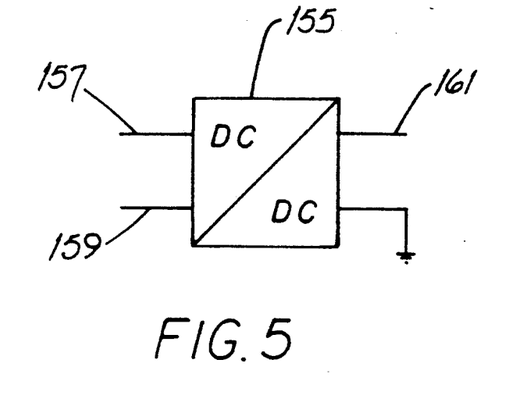
FIG. 5 is a block diagram of a DC-to-DC power supply.

As shown in FIG. 3, a DC-to-DC power supply 155 has its input terminals 157, 159 connected to the battery positive and negative terminals, respectively. Its non-grounded output terminals, all represented by the single terminal 161, provide 5 VDC for logic circuitry, 5 VDC or 12 VDC for analog circuitry and up to about 15 VDC above the nominal battery terminal voltage for transistor control.

Figure 6:
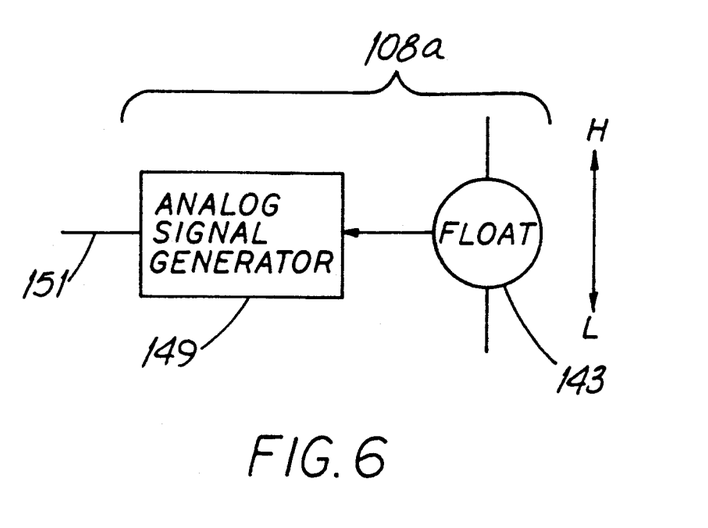
FIG. 6 is a representative depiction of a water level sensor.

Referring further to FIG. 3, the means for sensing water level, i.e., sensor 108, may be of the conventional two-position "binary" type. A typical two-position sensor 108 includes a float 143, an attached rod 145 and two positionally-adjustable "stops" 147 on the rod 145. The rod extends through the trip bracket of an on-off switch and the bracket is positioned between the stops. As water level in the sump 23 rises and falls, the float 143 rises and falls to start and stop the pump 27.

However, the new system 10 is not constrained to the use of a conventional sensor 108 and, in fact, a number of advantages result from using a sensor of another type. Another type of sensor 108a includes a float 143 in signal-producing relationship to an output device such as an analog signal generator 149. The generator 149 provides a signal at its output terminal 151.

In a simpler configuration, the signal represents at least a lower level and a higher level of water in the sump 23. If the inverter frequency is variable in steps and when the frequency of its output voltage is increased at the higher water level, the motor 65 rotates at a higher speed when the level of water in the sump reaches the higher level.

In a more refined system, the sensor 108a provides a continuum of signals representing changing water level and the inverter 49 provides output voltage to the motor 65 at a frequency which is a function of water level in the sump 23 and which is continuously variable over a range. When the system 10 is so arranged, the motor 65 rotates at progressively higher speed with increasing sump water levels. In control parlance, the matter of water level control using the sump pump system 10 may be said to represent a process. The system 10 has a process variable (the water level signal), a control variable (the inverter output frequency) and a reference value such as the desired minimum water level in the sump 23.

While the principles of this invention have been described in connection with specific embodiments, it should be understood clearly that these descriptions are made only by way of example and are not intended to limit the scope of the invention.

I claim:

1. In a sump pump drive system operable in a normal mode when AC line power is available or emergency mode when AC line power has failed, the system being powered in the normal mode by a single phase AC source and having an AC-to-DC converter, a DC standby source, a sump pump and a pump drive motor, the improvement wherein:
   the pump drive motor is a poly-phase AC machine;
   the system further comprises a polyphase DC-to-AC inverter connected to the drive motor;
   the system includes a battery charger connected between the converter and the inverter for periodically charging the DC standby source; and,
   the pump drive motor is driven using inverted DC power in both normal and emergency modes.

2. The system of claim 1 wherein the inverter is of the variable frequency type, the system has a water level sensor providing a signal representing water level in a sump and further has a process variable, a control variable and a reference value and wherein:
   the process variable is the water level signal;
   the control variable is the inverter output frequency; and,
   the reference value represents the desired minimum water level in the pump.

3. The system of claim 1 wherein the AC source has a nominal rated AC voltage and the DC standby source has a nominal terminal voltage less than about 50% of such nominal rated AC voltage.

4. The system of claim 3 wherein the pump drive motor has a rated voltage not substantially greater than the nominal DC terminal voltage.

5. The system of claim 1 wherein the DC source is a battery having a nominal full-charge terminal voltage and the system further includes a battery charging circuit wherein during extended normal system operation:
   battery charging current is regulated to maintain a trickle charge; and,
   battery charging voltage is limited to a value not in excess of about 108% of the full-charge terminal voltage,
whereby battery life is extended and the rate of electrolyte diminution is reduced.

6. The system of claim 5 wherein the battery provides current at a nominal emergency value in emergency mode operation and wherein, following extended operation in the emergency mode, the charging circuit provides a battery charge current at least about 30% greater than the nominal emergency value.

7. The system of claim 1 further including a battery exercise circuit whereby during extended system operation in the normal mode, energy is periodically drawn from the battery thereby substantially maintaining battery efficiency.

8. The system of claim 7 wherein energy is drawn from the battery by modulating the inverter to dissipate energy in the motor while yet avoiding motor rotation.

9. The system of claim 1 wherein the AC source has a substantially constant frequency, the motor has a rated frequency at its maximum rated voltage and such frequency is no less than about 105% or no greater than about 95% of the AC source frequency.

10. The system of claim 9 wherein the AC source frequency is 60 Hz and the motor nominal frequency is less than about 57 Hz or more than about 63 Hz.

11. The system of claim 1 wherein the inverter is of the variable frequency type and has a rated output voltage and the motor is started at a voltage substantially less than such rated output voltage, thereby reducing water-hammer noise.

12. The system of claim 11 wherein the motor is accelerated to running speed by step-wise increasing the inverter output voltage and frequency applied to the motor.

13. The system of claim 11 wherein the inverter powers the motor at an output voltage and frequency which are continuously-variable over a range and the motor is accelerated to running speed by increasing output voltage and frequency in a continuum.

14. The system of claim 1 wherein the inverter is of the pulse width modulated, voltage source type.

15. The system of claim 14 wherein the inverter provides voltage to the motor having either of at least two frequencies.

16. The system of claim 15 for use with a water-collecting sump and wherein such frequencies are selected as a function of the level of water in the sump.

17. The system of claim 16 further including a water level sensor providing a signal representing each of at least a lower level and a higher level of water in the sump and wherein:
   the inverter provides output voltage to the motor at a frequency variable in steps; and,
   the frequency is increased at the higher water level, whereby the motor rotates at a higher speed when the level of water in the sump reaches the higher level.

18. The system of claim 16 further including a water level sensor and wherein:
   the sensor provides a continuum of signals representing changing water level;
   the inverter provides output voltage to the motor at a frequency which is continuously-variable over a range;
   the frequency of such output voltage is a function of water level in the sump; and,
   the motor rotates at higher speed with increasing sump water level.

19. In a sump pump drive system operable in a normal mode when AC line power is available or emergency mode when AC line power has failed, the system being powered in the normal mode by a single phase AC source and having an AC-to-DC converter, a DC standby source, a sump pump and a pump drive motor, the improvement wherein:
   the pump drive motor is a poly-phase AC machine;
   the system further comprises a DC-to-AC inverter connected to the drive motor;
   the inverter is of the variable frequency type and has a rated output voltage;
   the motor is started at a voltage substantially less than the rated output voltage; and,
   the pump drive motor is driven using inverted DC power in both the normal and emergency modes.

20. The system of claim 19 wherein the motor is accelerated to running speed by step-wise increasing the inverter output voltage and frequency applied to the motor.

21. The system of claim 19 wherein the inverter powers the motor at an output voltage and frequency which are continuously-variable over a range and the motor is accelerated to running speed by increasing output voltage and frequency in a continuum.

22. In a sump pump drive system operable in a normal mode when AC line power is available or emergency mode when AC line power has failed, the system being powered in the normal mode by a single phase AC source and having an Ac-to-DC converter, a battery DC standby source, a sump pump and a pump drive motor, the improvement wherein:
   the pump drive motor is a poly-phase AC machine;
   the system includes a DC-to-AC inverter connected to the drive motor;
   the system further includes a battery exercise circuit periodically drawing energy from the battery by modulating the inverter to dissipate energy in the motor while yet avoiding motor rotation; and,
   the pump drive motor is driven using inverted DC power in both the normal and emergency modes.

* * * * *

UNITED STATES PATENT AND TRADEMARK OFFICE
CERTIFICATE OF CORRECTION

PATENT NO. : 5,234,319
DATED : August 10, 1993
INVENTOR(S) : Richard W. Wilder It is certified that error appears in the above-identified patent and that said Letters Patent is hereby corrected as shown below:

In column 6, lines 54 and 55, delete "is provided immediately following the word "explanation" in line 33--.

In column 6, line 55 insert --is provided-- after the word "explanation".

In column 8, line 22, after the word "it", insert --will be appreciated that three phase inverter 49 and--.

In column 12, line 16, delete "Ac-to-DC" and insert --AC-to-DC--.

Signed and Sealed this

Fifteenth Day of March, 1994

Attest:

BRUCE LEHMAN

*Attesting Officer*    *Commissioner of Patents and Trademarks*